(12) United States Patent
Jin et al.

(10) Patent No.: US 9,275,240 B2
(45) Date of Patent: Mar. 1, 2016

(54) SYNCHRONIZED VIRTUAL TRUSTED PLATFORM MODULES (VTPM) AND VIRTUAL MACHINE (VM) ROLLBACKS

(71) Applicant: HUA ZHONG UNIVERSITY OF SCIENCE TECHNOLOGY, Wuhan, Hubei (CN)

(72) Inventors: Hai Jin, Hubei (CN); Deqing Zou, Hubei (CN); Weiqi Dai, Hubei (CN); Fengwei Wang, Hubei (CN)

(73) Assignee: Hua Zhong University of Science Technology, Wuhan, Hubei (CN)

( * ) Notice: Subject to any disclaimer, the term of this patent is extended or adjusted under 35 U.S.C. 154(b) by 0 days.

(21) Appl. No.: 14/422,591

(22) PCT Filed: Jul. 9, 2013

(86) PCT No.: PCT/CN2013/079039
§ 371 (c)(1),
(2) Date: Feb. 19, 2015

(87) PCT Pub. No.: WO2015/003310
PCT Pub. Date: Jan. 15, 2015

(65) Prior Publication Data
US 2015/0199524 A1    Jul. 16, 2015

(51) Int. Cl.
*G06F 7/04*    (2006.01)
*G06F 21/60*    (2013.01)
*G06F 9/455*    (2006.01)
(Continued)

(52) U.S. Cl.
CPC ............. *G06F 21/60* (2013.01); *G06F 9/455* (2013.01); *G06F 9/45558* (2013.01); *G06F 9/46* (2013.01); *G06F 21/00* (2013.01); *G06F 2009/45587* (2013.01)

(58) Field of Classification Search
CPC .............................. G06F 21/62; G06F 21/6209
USPC ...................................................... 726/1–15
See application file for complete search history.

(56) References Cited

U.S. PATENT DOCUMENTS 7,392,403 B1 * 6/2008 Munetoh ...................... 713/193
7,587,595 B2    9/2009 Scarlata et al.
(Continued)

FOREIGN PATENT DOCUMENTS

CN    101770140 A    7/2010

OTHER PUBLICATIONS

Gomes et al., "Multiplexed State Saving for Bounded Rollback," Simulation Conference, 1997., Proceedings of the 1997 Winter Year: 1997 pp. 460-467.*
(Continued)

*Primary Examiner* — Christopher Brown
*Assistant Examiner* — Roderick Tolentino
(74) *Attorney, Agent, or Firm* — Brundidge & Stanger, P.C.

(57) ABSTRACT

In at least one embodiment, a method for secured rollback of a virtual Trusted Platform Module (vTPM) that renders available functionalities offered by Trusted Platform Module (TPM) on a computer to a virtual machine (VM) is provided. The method includes taking and saving a snapshot of current state of a virtual machine as well as a snapshot of the corresponding vTPM, upon receiving a request for taking a snapshot of the virtual machine. The method further includes converting the snapshots into the current state of the virtual machine and the current state of the vTPM, respectively, upon receiving a request to roll back the virtual machine.

17 Claims, 4 Drawing Sheets

(51) Int. Cl.
*G06F 9/46* (2006.01)
*G06F 21/00* (2013.01)

(56) References Cited

U.S. PATENT DOCUMENTS

| | | | | |
|---|---|---|---|---|
| 7,932,403 | B2* | 4/2011 | Bobal | C07D 207/34 548/530 |
| 8,954,965 | B2* | 2/2015 | Novak | G06F 21/53 718/1 |
| 2005/0210467 | A1 | 9/2005 | Zimmer et al. | |
| 2008/0244569 | A1 | 10/2008 | Challener et al. | |
| 2008/0313743 | A1* | 12/2008 | Chan | G06F 21/10 726/28 |
| 2009/0125902 | A1 | 5/2009 | Ghosh et al. | |
| 2010/0251004 | A1 | 9/2010 | Schuba et al. | |
| 2010/0293146 | A1 | 11/2010 | Bonnet et al. | |
| 2012/0054843 | A1* | 3/2012 | Horman | G06F 21/31 726/7 |
| 2012/0151206 | A1* | 6/2012 | Paris | H04L 63/08 713/155 |
| 2013/0218915 | A1* | 8/2013 | Billau | H04W 12/10 707/755 |
| 2014/0164701 | A1* | 6/2014 | Guthrie | G06F 12/0806 711/119 |
| 2014/0325170 | A1* | 10/2014 | Aswathanarayana | G06F 9/45558 711/162 |
| 2015/0199524 | A1* | 7/2015 | Jin | G06F 9/45558 726/26 |

OTHER PUBLICATIONS

Yu et al., "Security Challenges on the Clone, Snapshot, Migration and Rollback of Xen Based Computing Environments," ChinaGrid Conference (ChinaGrid), 2010 Fifth Annual Year: 2010 pp. 223-227.*
"Trusted Platform Module," Accessed at http://web.archive.org/web/20130617175150/http://en.wikipedia.org/wiki/Trusted_Platform_Module, Jun. 17, 2013, pp. 7.
"Virtual TPM (vTPM) implementation in Xen," Accessed at http://cybione.org/~cdidier/blog1200901221025.html, Jan. 22, 2009, pp. 6.
"Xen 4.2.2 is now available in CentOS 6.4," Accessed at http://web.archive.org/web/20130702233924/http://www.xenproject.org/, Accessed on Jul. 2, 2013, pp. 6.
Berger, S. et al., "vTPM: Virtualizing the Trusted Platform Module," Proceedings of the 15th USENIX Security Symposium, pp. 305-320 (Feb. 2006).
International Search Report and Written Opinion in International Patent Application No. PCT/CN2013/079039 mailed Apr. 16, 2014.

* cited by examiner

SYNCHRONIZED VIRTUAL TRUSTED PLATFORM MODULES (VTPM) AND VIRTUAL MACHINE (VM) ROLLBACKS

CROSS-REFERENCE TO RELATED APPLICATION

This Application is the National Stage filing under 35 U.S.C. §371 of PCT Application Ser. No. PCT/CN13/79039 filed on Jul. 9, 2013. The disclosure of the PCT Application is hereby incorporated herein by reference in its entirety.

TECHNICAL FIELD

The embodiments described herein relates generally to maintaining state consistency between virtual Trusted Platform Modules (vTPMs) and corresponding virtual machines (VMs).

BACKGROUND

Cloud computing typically requires robust security, prompting advancements in trusted computing technologies. Trusted Platform Module (TPM) technologies may be implemented to facilitate computing security in computer hardware. For example, a TPM may be implemented in integrated circuits that may be integrated into a computer motherboard.

Typically, a TPM authenticates and protects a host computer by, e.g., storing information specific to the host computer. Such information may include encryption keys, digital certificates and passwords. Accordingly, a TPM may facilitate secure booting sequences, ensure the integrity of the software stack in the computer system, remotely attest state of a computer system, and securely seal or unseal crypto keys and confidential data in the computer system.

In a virtual computing environment, a software program, e.g., a virtual machine manager (VMM), may monitor and manage operations of one or more virtual machines running on the computer system. A virtual machine may simulate a computer system, but the virtual machine does not have to be on the same computer system as the computer system that it is simulating. A VMM may isolate workloads and mediate or regulate access to physical resources of the simulated computer system among multiple virtual machines.

A software program, e.g., a virtual TPM (vTPM), may be used to virtualize and make available the TPM capacities to all virtual machines running on top of a VMM in the computer system. Multiple instances of a vTPM may be created that fully simulate a TPM which is implemented in hardware. Typically, a computer system may only have a single TPM hardware; via the use of a vTPM, each virtual machine needing TPM capacities may operate with the confidence that it has its own private TPM. Secure operation of a vTPM requires a secure association between a virtual machine and the corresponding vTPM.

SUMMARY

In at least one embodiment, a method for secured rollback of a virtual Trusted Platform Module (vTPM) that renders available functionalities offered by Trusted Platform Module (TPM) on a computer to a virtual machine (VM) may include taking and saving a snapshot of current state of a virtual machine as well as a snapshot of current state of the corresponding vTPM, upon receiving a request for taking a snapshot of the virtual machine. The method may further include converting the snapshots into the current state of the virtual machine and the current state of the vTPM, respectively, upon receiving a request to roll back the virtual machine.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
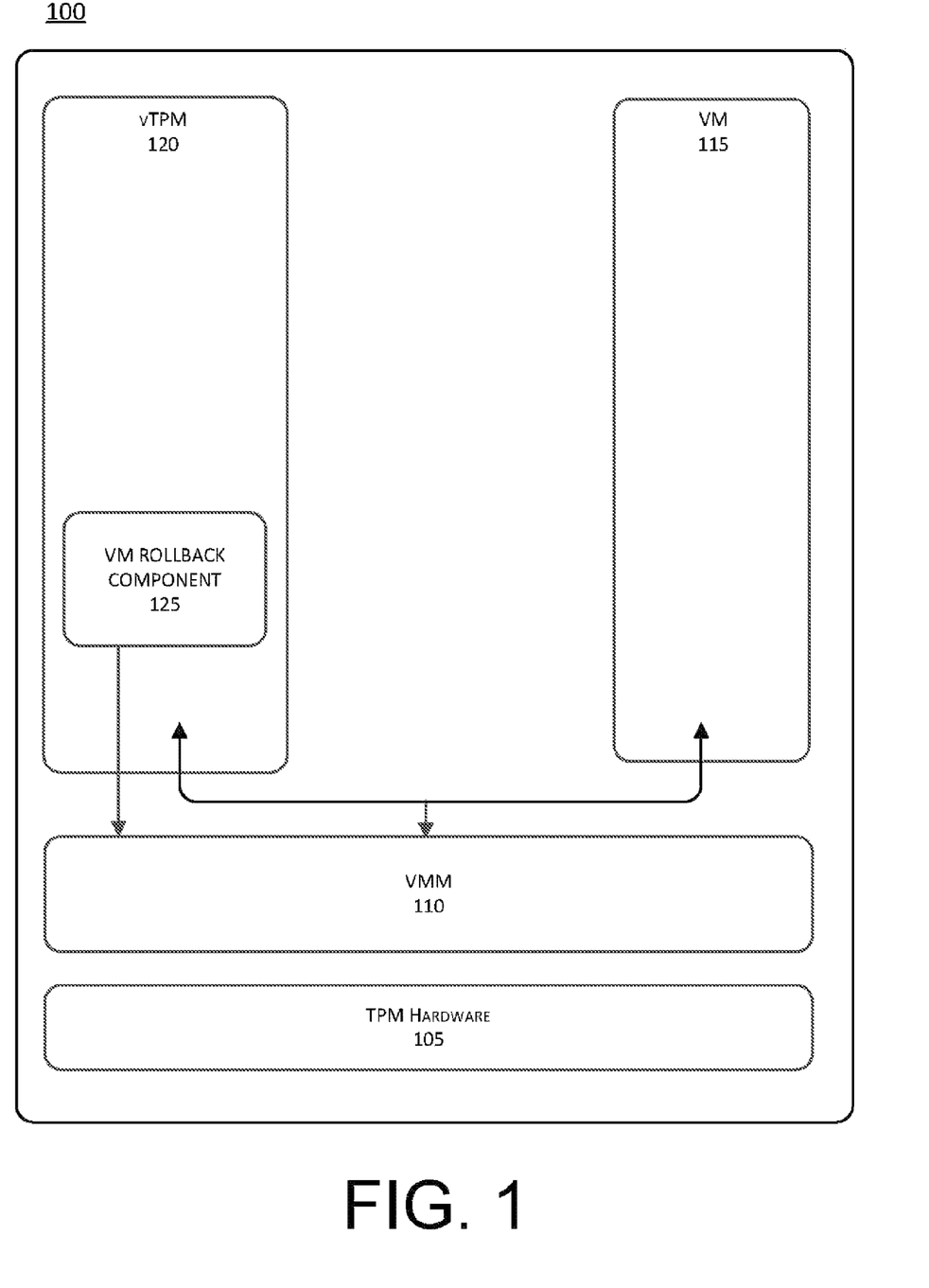
FIG. 1 shows a configuration of an example system in which synchronized vTPM and VM rollbacks may be implemented.

FIG. 1 shows a configuration of an example system 100 in which synchronized vTPM and VM rollbacks may be implemented, arranged in accordance with at least some embodiments described herein. As depicted, system 100 includes, at least, TPM hardware 105 implemented with TPM functionalities, a VMM 110 to manage one or more virtual machines such as a VM 115, a vTPM 120 to render available the TPM functionalities in TPM hardware 105 to the one or more virtual machines, e.g., VM 115, managed by VMM 110, and a VM rollback component 125 to synchronize rollbacks of the one or more virtual machines, e.g., VM 115, managed by VMM 110, and vTPM 120.

As referenced herein, "rollback" may refer to reverting a current state of a virtual machine (e.g., VM 115), or of a vTPM (e.g., vTPM 120), back to a previous state.

System 100 may refer to a processor-based electronic device that may be connected to a communication network (not shown), and may be a cloud-based system. Further, system 100 may be implemented as a mobile (or portable) electronic device such as a mobile phone, cell phone, smartphone, personal data assistant (PDA), a personal media player device, an application specific device, or a hybrid device that includes any of the above functions. Alternatively, system 100 may also be implemented as a personal computer including tablet, laptop computer, and non-laptop computer configurations, which may be connected to the aforementioned communications network, which can be a mobile wireless network, or alternatively, a wired network.

TPM hardware 105 may refer to computer hardware that is configured to execute TPM functions. Non-limiting examples of TPM hardware 105 may include a computer motherboard, and/or a computer chip. In at least one example embodiment, TPM hardware 105 may be a combination of a computer motherboard with a chip installed on the computer motherboard, in which the installed chip may execute TPM functionalities. In accordance with some examples, TPM hardware 105 may be replaced by a virtual TPM subsystem, which may fulfill the same functionality as TPM hardware 105 and executes on one or more tamper-sensing components of the example system 100, e.g., PCI-X Cryptographic Coprocessor (PCIXCC).

VMM 110 may refer to a virtual machine manager that may be configured to create and manage one or more virtual machines, e.g., VM 115, for system 100. VMM 110 may be implemented as a software program, firmware, or as hardware—e.g., as part of TPM hardware 105. VMM 110 may execute directly on top of TPM hardware 105, or may execute within a computer operating system (not shown) that itself executes on top of TPM hardware 105.

VM 115 may refer to one of the one or more virtual machines that may be created and managed by VMM 110. Virtual machines may refer to one or more software emulations of physical computing devices, which may be configured to execute software programs as real physical computing devices.

vTPM 120 may refer to a virtual TPM that may be configured to render available TPM functionalities provided by TPM hardware 105 to the one or more virtual machines such as VM 115 that are managed by VMM 110. The TPM functionalities may at least include storing cryptographic keys that protect information and authenticate hardware devices.

VM rollback component 125 may refer to a component that may be configured to synchronize a rollback of VM 115 with the rollback of its corresponding vTPM 120 so that the states of VM 115 and vTPM 120 are consistent. In at least one example embodiment, in response to a request for a snapshot of VM 115 from, for example, a user, VM rollback component 125 may take and save one or more snapshots of both the current state of VM 115 and the current state of vTPM 120 as snapshot files. VM rollback component 125 may also save information related to the snapshot files in one or more corresponding registers. Such information may include, but not limited to, the current respective states of VM 115 and vTPM 120 that are taken as the snapshots, a time at which the respective snapshots are taken, or other information such as information regarding the requestor that requested the snapshot of VM 115 such as the identity of the requestor, the geographical location of the requestor, the reason for the requests, etc.

As referenced herein, "snapshot" may refer to, e.g., a capture of an object's state at a specific moment in time, and "snapshot file" may refer to, e.g., a file in which the state of the object may be saved. A snapshot of a virtual machine may include information relates to the virtual machine's power state, e.g., powered-on, powered-off, suspended, etc., system information such as registry keys, installed programs, etc., and hardware information. The hardware information may include data relates to hard disks, memories, virtual network interface cards, etc. The snapshot file may be used later for rolling a VM or vTPM back to the state captured by the file.

In at least one example embodiment, VM rollback component 125 may further receive a request to roll VM 115 back to a previous state of VM 115 captured in a previous snapshot file. In response to receiving such a request, VM rollback component 125 may set a current state of VM 115 and of vTPM 120, respectively, to a previous state stored in one of one or more previously taken snapshot files of VM 115 and of vTPM 120. That is, the aforementioned power state, system information, and hardware information associated with VM 115 and vTPM 120 may be loaded from the saved snapshot files to replace the current corresponding power state, system information, and hardware information. For example, a software program installed on the virtual machine after the snapshots were taken may disassociated from relevant system files, e.g., registry, when the virtual machine is rolled back to a previous state when the snapshot were taken.

In one embodiment of the implementation, VM rollback component 125 may save the current state of VM 115 and the current state of vTPM 120 before restoring them from the one or more previously saved snapshot files thereof. VM rollback component 125 may also save information such as time that the rollbacks, e.g., the restorations, occur, and/or information regarding the user who requests the rollback of VM 115—the information may be used later, e.g., for tracing the origin of the request.

In taking snapshots of VM 115 and vTPM 120 concurrently and rolling them back simultaneously, VM rollback component 125 may ensure that the state of VM 115 and the state of vTPM 120 are consistent.

Figure 2:
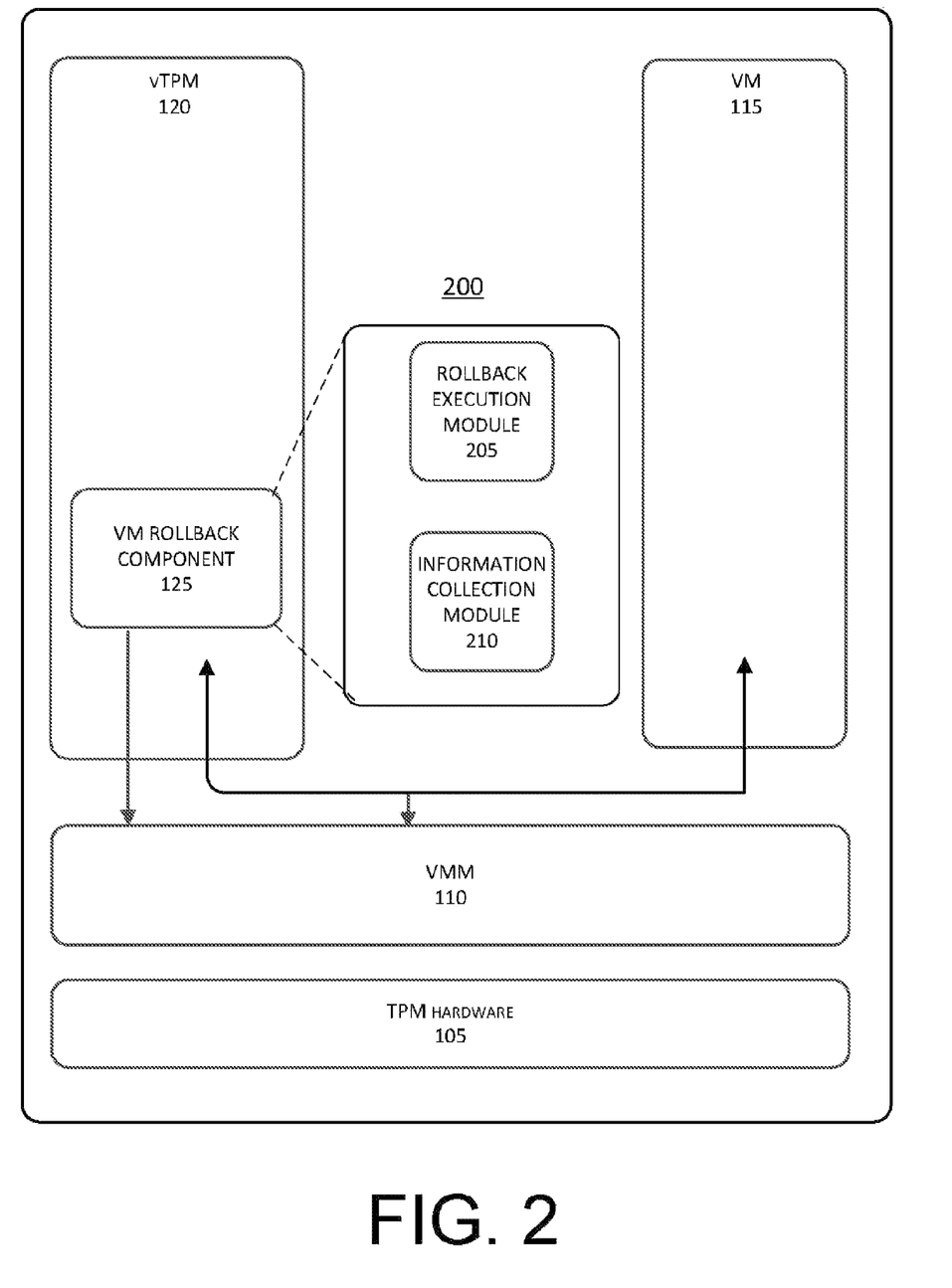
FIG. 2 shows a configuration of a VM rollback component of the example system of FIG. 1.

FIG. 2 shows a configuration 200 of VM rollback component 125 of example system 100 of FIG. 1, arranged in accordance with at least some embodiments described herein. Those components in FIG. 2 that are labeled identically to components of FIG. 1 will not be described again for the purposes of clarity.

As depicted, VM rollback component 125 may include a rollback execution module 205 and an information collection module 210. Rollback execution module 205 may refer to a module that is configured to take and save one or more snapshots of VM 115 and its corresponding vTPM 120 concurrently, upon receiving a request for one or more snapshots of VM 115 from, e.g., a user of VM 115. Rollback execution module 205 may also be configured to restore VM 115 and vTPM 120 each to a previous state according to the saved snapshots, respectively, in response to receiving a request, e.g., from a user of VM 115, to roll back VM 115. Rollback execution module 205 may do so by loading the aforementioned power state, system information, and hardware information associated with VM 115 and vTPM 120 from the saved snapshot files to replace corresponding information of the current state.

Information collection module 210 may refer to a module that is configured to save information relevant to take the snapshots and/or to implement the one or more rollbacks. For example, information collection module 210 may save a current state of VM 115 and a current state of its corresponding vTPM 120 before rollback execution module 205 may take the snapshots of VM 115 and vTPM 120 or make the rollbacks of them. Information collection module 210 may also save the time at which the snapshots are taken or the time when the rollbacks occur, and/or information regarding the user who requests to take a snapshot of VM 115 or the user who requests to rollback VM 115. The aforementioned information may be saved, by information collection module 210, in a corresponding one of one or more registers, e.g., Platform Configuration Registers (PCRs) in Xen virtual environment.

In an example embodiment, one or more pairs of snapshot files of VM 115 and vTPM 120 may exist in system 100, and therefore the corresponding information collected regarding the one or more pairs of snapshots may also be stored accordingly. A request to roll back VM 115 may identify which snapshot of VM 115 may be desired for the rollback.

Figure 3:
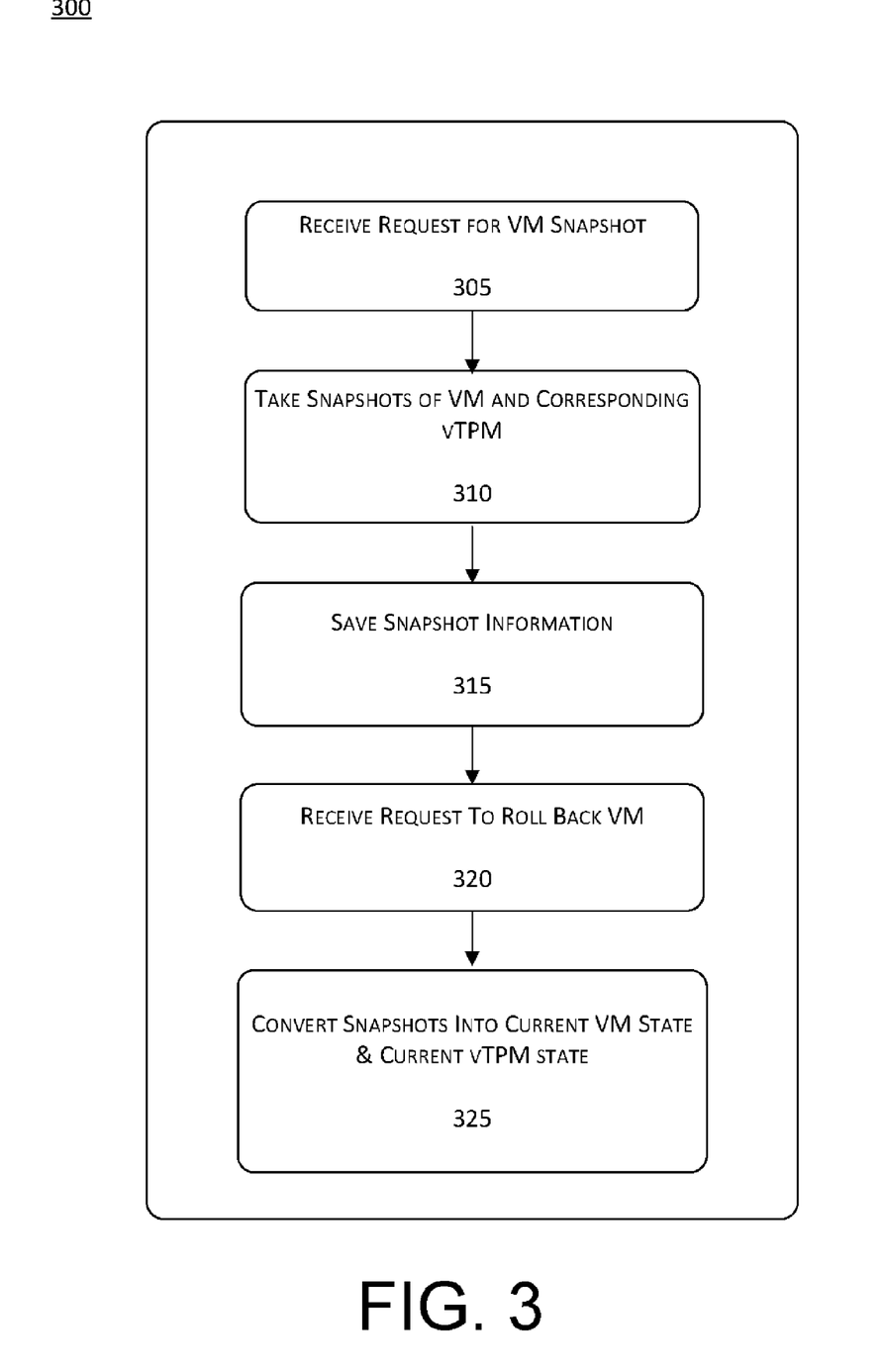
FIG. 3 shows an example processing flow of operations for synchronizing rollbacks of a vTPM and a VM.

FIG. 3 shows an example processing flow 300 of operations for synchronizing rollbacks of a VM and a vTPM, arranged in accordance with at least some embodiments described herein. As depicted, processing flow 300 may include sub-processes executed by various components that are part of VM rollback component 125 hosted by system 100. However, implementation of processing flow 300 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 305, 310, 315, 320, and/or 325. Processing flow 300 may begin at block 305.

Block 305 (Receive Request for VM Snapshot) may refer to vTPM 120 receiving a request to take a snapshot of VM 115 from, e.g., a user of the VM 115. As stated above, vTPM 120 may be configured to make available TPM functions provided by TPM hardware 105 to one or more virtual machines, e.g., VM 115 that are managed by VMM 110. Processing flow 300 may continue from block 305 to block 310.

Block 310 (Take Snapshots of VM and Corresponding vTPM) may refer to VM Rollback Component 125 taking and saving a snapshot of VM 115 in its current state and a snapshot of vTPM 120 in its current state. Processing flow 300 may continue from block 310 to block 315.

Block 315 (Save Snapshot Information) may refer to VM Rollback Component 125 collecting information that may be relevant to the snapshots taken by VM rollback component 125, as referenced in Block 310. In a non-limiting example, VM Rollback Component 125 may save a copy of the current state of VM 115 and of its corresponding vTPM 120, respectively, and further collect information regarding the time at which the snapshots are taken and regarding the user who requests the snapshot of VM 115, if the request comes from a user of VM 115, so later when needed, system 100 can trace back who makes the request, at what tie, in which context. Processing flow 300 may continue from block 315 to block 320.

Block 320 (Receive Request to Roll Back VM) may refer to VM Rollback Component 125 receiving a request to revert VM 115 to a previous state that is captured by the snapshot taken by VM rollback component 125, as referenced in block 310. Processing flow 300 may continue from block 320 to block 325.

Block 325 (Convert Snapshots Into Current VM State and Current vTPM State) may refer to VM Rollback Component 125 restoring the current state of VM 115 and the current state of vTPM 120, based on the snapshot files taken at block 310 and saved at block 315, to a respective previous state. That is, VM Rollback Component 125 may be configured to load the aforementioned power state, system information, and hardware information associated with VM 115 and vTPM 120 from the saved snapshot files to replace corresponding information of the current state of VM 115 and of vTPM 120. In a non-limiting example, VM Rollback Component 125 may also save information related to the aforementioned restorations in one or more PCRs. Such information may include a current state of VM 115 and/or of vTPM 120 before the restorations, a time at which the conversions occur, and/or information regarding the user who requests the rollback of VM 115, if the request comes from a user of VM 115, so that system 100 may keep track of who makes the request, at what time, in which context. Processing flow 300 may thus end; and VM 115 and vTPM 120 remain consistent in their respective states.

Figure 4:
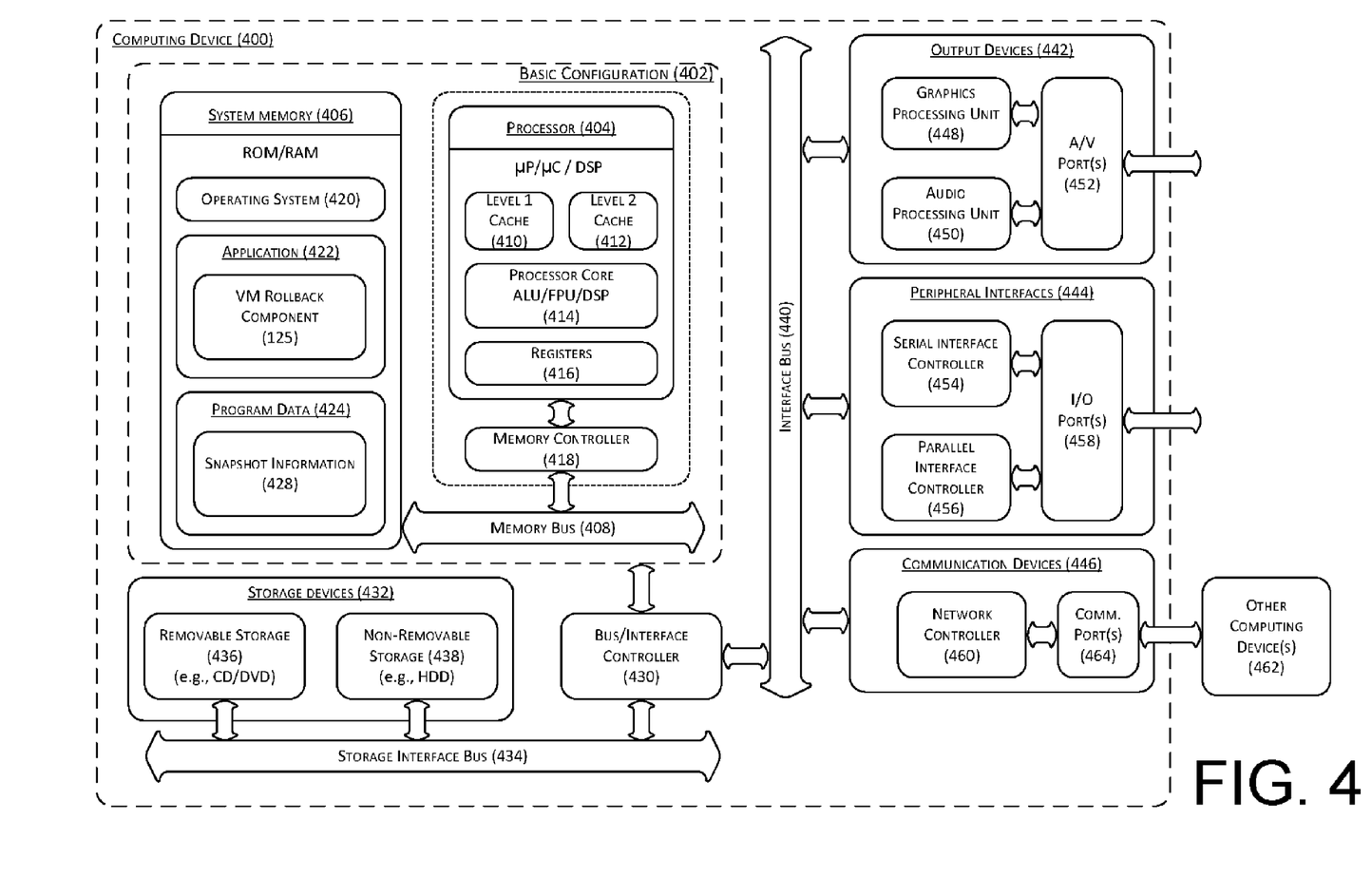
FIG. 4 shows a block diagram illustrating an example computing device by which various example solutions described herein may be implemented, all arranged in accordance with at least some embodiments described herein.

FIG. 4 is a block diagram illustrating an example computing device 400 that is arranged for synchronized vTPM and VM rollbacks in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a VM rollback component 125 that is arranged to take/save snapshots of a VM and a corresponding vTPM. Program data 424 may include snapshot information 428 that may be useful for rolling back a VM and corresponding vTPM as is described herein. In some embodiments, application 422 may be arranged to operate with program data 424 on operating system 420 such that VM and vTPM rollbacks may be implemented securely. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
a memory;
at least one computer processor coupled to the memory and configured to provide functionalities offered by a Trusted Platform Module (TPM);
at least one virtual machine (VM);
at least one virtual Trusted Platform Module (vTPM) stored in the memory and executable by the at least one computer processor, the at least one vTPM corresponding to the VM and configured to render the functionalities offered by the TPM available to the VM; and
a VM rollback component, stored in the memory and executable by the at least one computer processor, the VM rollback component configured to:
upon receiving a request for a snapshot of the VM, take a snapshot of a current state of the VM and a snapshot of a current state of the corresponding vTPM, and save the snapshot of the current state of the VM as a VM snapshot file and the snapshot of the current state of the corresponding vTPM as a vTPM snapshot file, and synchronize a rollback of the VM and the corresponding vTPM, based on the VM snapshot file and the vTPM snapshot file, to maintain state consistency between the VM and the corresponding vTPM, wherein the rollback of the VM and the corresponding vTPM occurs simultaneously based on the VM snapshot file and the vTPM snapshot file.

2. The system of claim 1, wherein the VM rollback component is further configured to save information including the current state of the VM, the current state of the corresponding vTPM, or a time that the respective snapshot files are created, before saving the current state of the VM as the VM snapshot file and the current state of the corresponding vTPM as the vTPM snapshot file.

3. The system of claim 1, wherein the VM rollback component is further configured to convert the VM snapshot file into the current state of the VM and to convert the vTPM snapshot file into the current state of the corresponding vTPM, upon receiving a request for a rollback of the VM.

4. The system of claim 3, wherein the VM rollback component is configured to save information including a time that the rollback occurs, a state of the VM before the rollback occurs, or a state of the corresponding vTPM before the rollback occurs, before converting the VM snapshot file into the current state of the VM and the vTPM snapshot file into the current state of the corresponding vTPM.

5. An apparatus for secured rollback of a virtual Trusted Platform Module (vTPM) that renders available functionalities offered by Trusted Platform Module (TPM) on a computer to a virtual machine (VM), comprising:
   a memory and at least one computer processor coupled to the memory;
   a rollback execution module, stored in the memory and executable by the at least one computer processor, the rollback execution module configured to:
   upon receiving a request for a snapshot of the VM, take a snapshot of a current state of the VM and a snapshot of a current state of the corresponding vTPM, and save the snapshot of the current state of the VM as a VM snapshot file and the snapshot of the current state of the corresponding vTPM as a vTPM snapshot file, and
   synchronize rollback of the VM and the vTPM, based on the VM snapshot file and the vTPM snapshot file, to maintain state consistency between the VM and the corresponding vTPM, wherein the rollback of the VM and the corresponding vTPM occurs simultaneously based on the VM snapshot file and the vTPM snapshot file; and
   an information collection module, stored in the memory and executable by the at least one computer processor, the information collection module configured to collect information associated with the rollback execution module.

6. The apparatus of claim 5,
   wherein the information collection module is further configured to save information including a time that a requested snapshot of the VM is taken, a current state of the VM, or a current state of the vTPM.

7. The apparatus of claim 6,
   wherein the information collection module is further configured to save information including a time that a requested rollback of the VM occurred, a state of the VM before the requested rollback of the VM occurred, or a state of the vTPM before the requested rollback of the VM occurred; and
   wherein the rollback execution module is further configured to convert the VM snapshot file into the current state of the VM and to convert the vTPM snapshot file into the current state of the vTPM.

8. A method for secured rollback of a virtual Trusted Platform Module (vTPM) that renders available functionalities offered by Trusted Platform Module (TPM) on a computer to a virtual machine (VM), comprising:
   in response to receiving a request for a snapshot of the VM, taking a snapshot of a current state of the VM and a snapshot of a current state of the vTPM, and saving the snapshot of the current state of the VM as a VM snapshot file and the snapshot of the current state of the vTPM as a vTPM snapshot file; and
   in response to receiving a request for a rollback of the VM, converting the VM snapshot file into the current state of the VM and the vTPM snapshot file into the current state of the vTPM simultaneously.

9. The method of claim 8, further comprising:
   saving information regarding the request for the snapshot of the VM.

10. The method of claim 9, wherein the saved information includes a time that the snapshot of the VM is taken, a current state of the VM, or a current state of the vTPM.

11. The method of claim 8, further comprising:
    saving information regarding the request for the rollback of the VM.

12. The method of claim 11, wherein the saved information regarding the request for the rollback of the VM includes a time that the rollback of the VM occurs, a state of the VM before the rollback of the VM occurs, or a state of the vTPM before the rollback of the VM occurs.

13. A non-transitory computer-readable medium that stores computer-executable instructions that, when executed, cause one or more processors to perform operations comprising:
    receiving a request for a snapshot of a virtual machine (VM) that uses a virtual Trusted Platform Module (vTPM) that renders available functionalities offered by Trusted Platform Module (TPM) on a computer on which the VM operates;
    taking a snapshot of a current state of the VM and a snapshot of a current state of the vTPM;
    saving the snapshot of the current state of the VM as a VM snapshot file;
    saving the snapshot of the current state of the vTPM as a vTPM snapshot file;
    receiving a request for a rollback of the VM; and
    converting the VM snapshot file into the current state of the VM and the vTPM snapshot file into the current state of the vTPM simultaneously.

14. The non-transitory computer-readable medium of claim 13, wherein the computer-executable instructions, when executed, further include:
    saving information regarding the request for the snapshot of the VM.

15. The non-transitory computer-readable medium of claim 14, wherein the saved information includes a time that the snapshot of the VM is taken, a current state of the VM, or a current state of the vTPM.

16. The non-transitory computer-readable medium of claim 13, wherein the computer-executable instructions, when executed, further include:
    saving information regarding the request for the rollback of the VM.

17. The non-transitory computer-readable medium of claim 16, wherein the saved information includes a time that the rollback of the VM occurs, a state of the VM before the rollback of the VM occurs, or a state of the vTPM before the rollback of the VM occurs.

* * * * *